United States Patent
Sherzer

(10) Patent No.: US 10,077,196 B2
(45) Date of Patent: *Sep. 18, 2018

(54) METHOD FOR SOLIDS REMOVAL IN HEAT EXCHANGERS

(71) Applicant: UET—INDUSTRIAL WATER RECYCLING LTD., Omer (IL)

(72) Inventor: David Sherzer, Omer (IL)

(73) Assignee: UET—INDUSTRIAL WATER RECYCLING LTD., Omer (IL)

( * ) Notice: Subject to any disclaimer, the term of this patent is extended or adjusted under 35 U.S.C. 154(b) by 42 days.

This patent is subject to a terminal disclaimer.

(21) Appl. No.: 15/396,839

(22) Filed: Jan. 3, 2017

(65) Prior Publication Data

US 2017/0144900 A1 May 25, 2017

Related U.S. Application Data

(63) Continuation of application No. 14/441,182, filed as application No. PCT/IB2013/060177 on Nov. 15, 2013, now Pat. No. 9,573,827.

(30) Foreign Application Priority Data

Nov. 15, 2012 (IL) .......................................... 223079

(51) Int. Cl.
| | |
|---|---|
| *C02F 1/463* | (2006.01) |
| *B01D 21/02* | (2006.01) |
| *F28F 19/01* | (2006.01) |
| *F28F 25/00* | (2006.01) |
| *C02F 103/02* | (2006.01) |

(52) U.S. Cl.
CPC .............. *C02F 1/463* (2013.01); *B01D 21/02* (2013.01); *F28F 19/01* (2013.01); *F28F 25/00* (2013.01); *C02F 2103/023* (2013.01); *F28F 2025/005* (2013.01)

(58) Field of Classification Search
CPC ........................... C02F 1/463; C02F 2103/023
See application file for complete search history.

(56) References Cited

U.S. PATENT DOCUMENTS

| | | | |
|---|---|---|---|
| 5,611,907 A | 3/1997 | Herbst et al. | |
| 9,573,827 B2 * | 2/2017 | Sherzer | C02F 1/463 |
| 2008/0115925 A1 | 5/2008 | Tanaka et al. | |
| 2011/0266203 A1 | 11/2011 | Frisky | |
| 2011/0290736 A1 | 12/2011 | Hebert | |
| 2015/0291450 A1 * | 10/2015 | Sherzer | C02F 1/463 |
| | | | 205/742 |

FOREIGN PATENT DOCUMENTS

| | | |
|---|---|---|
| JP | 2003334561 | 11/2003 |
| JP | 4126904 | 7/2008 |
| WO | 02090264 | 11/2002 |

* cited by examiner

*Primary Examiner* — Steven A. Friday
(74) *Attorney, Agent, or Firm* — Mark M. Friedman

(57) ABSTRACT

A method for solids removal in heat exchanger systems includes a first water flow path from a heat exchanger to a cooling tower and back to the heat exchanger, including: forming an additional path in parallel with the first path, wherein water flows from the heat exchanger to a UET reactor and back to the heat exchanger, and wherein the UET reactor including means for solids removal from the water using a partial electrolysis process. Optionally, the volumetric flow rate in the additional path is about 5% of the volumetric flow rate in the first water flow path.

14 Claims, 7 Drawing Sheets

METHOD FOR SOLIDS REMOVAL IN HEAT EXCHANGERS

The present application claims priority from application No. 223079 filed in Israel on 15 Nov. 2012 by the present applicant and inventor.

TECHNICAL FIELD

The present invention relates to methods for removing solids and minerals from heat exchangers in water-cooled systems and for preventing or reducing sedimentation of solids and minerals in various water conduits and water transfer equipment.

BACKGROUND ART

In heat exchangers and other equipment that act as water conduits, solids and minerals tend to precipitate and settle therein. These solids may interfere with the water passage through the system and may deteriorate the heat transfer performance in equipment which is designed to transfer heat from one medium to another.

The present invention addresses the problem of removing solids and minerals from heat exchangers in various types of water systems, and for keeping such other equipment and/or its water conduits free of sedimentation of solids and minerals; if not completely free of sedimentation, then a significant reduction thereof may be achieved.

i. For example, in a cooling tower application:

FIG. 1 details a prior art heat exchanger system. A heat exchanger 11 is used to cool down a high temperature fluid; the system may also include a temperature control valve 12.

Water is used to cool the fluid; in the process, the water itself becomes hot and it is required to cool the water down. The water is cooled in a cooling tower 2.

In the cooling tower 2, ambient air 21 is used to cool the water, through forced flow using a ventilation system; as part of the water evaporates, the water temperature decreases.

A problem in this method is that ambient air may contain dirt and dust;

The cooling tower 2 acts like a vacuum cleaner and sucks into it dirt from all around the tower.

During the water cooling process, the air comes into contact with the water, as illustrated with cold water 22 and suspended dust 23.

The cooling tower 2 may include a cooling water plastic net 24.

Due to the water evaporation process, there are vapors out 25.

FIG. 2 illustrates the problem during the operation of the prior art heat exchanger system, including:

1. The control valve is fully opened 41, dust is suspended
2. The control valve is partially closed 42, sedimentation starts
3. The control valve is fully closed 43, solid parts will drop
4. Scale will be formed between the solid parts, lumps of solids will block the pipe.

In prior art, during normal operation, suspended solids are usually carried by the velocity of the water and may pass without any significant interference and without settling or depositing scale. However, when the flow is reduced by control valves or other control means such as a variable speed drive to the pump, the water velocity is not powerful enough to carry those suspended solids, and a sedimentation process takes place.

When the water velocity returns to a full shut-off there is no force to carry those particles and the particles do settle. In these cases, those particles stick to the tubes or pipe lines and turn to be solid lumps where mineral scale starts to form between those solids.

ii. In some cases this problem is considerable, due to the fact that a machine room may be situated below the cooling tower and dirt will arrive to the circulation pipes by gravitation. The cooling system is controlled by a pump velocity controller which can create a situation of stagnant water in the heat exchanger.

DISCLOSURE OF INVENTION

According to one aspect of the present invention, a new method includes finding a critical velocity that should be maintained during circulation around the heat exchanger, to avoid or reduce the sedimentation of those suspended solids. The equipment for processing the ongoing cleaning phenomenon through a constant circulation may contain the following:

1. A pump with a calculated flow rate and head suitable to the flow of the water through the heat exchanger.
2. A partial electrolysis reactor, the UET Reactor™, which reacts with the excess of minerals and creates an electro-coagulation process.
3. The coagulated suspended solids, some of it sticks to the cathode of the reactor and some of it passes to the solid separator device.
4. A solid separator device is equipped with pipes that direct the velocity of the water in a way that coagulated solids will settle in it. Water free of suspended solids return to the heat exchanger.
5. The results—once the water is circulating through the reactor and the solid separator, the heat exchanger remains clean and the disturbing solids settle outside of the system.

In one embodiment, the new method may include:

(A) Calculating the amount of the second water stream that should be circulated. It was found that a 5% flow from the flow that passes through the heat exchanger is sufficient to keep the heat exchanger clean.

(B) The reactor is designed to operate at a water velocity of about 0.2 m/s.

(C) The residence time of cooling water in the UET reactor is so calculated as to maintain the water inside the reactor for the length of 1 meter.

(D) The velocity in the separator should change and have the following velocity profile:
a. Velocity into the separator—1 m/s.
b. Flow at the separator reduced to 0.15 m/s.
c. The outlet water velocity—1 m/s.

Example: In a heat exchanger wherein water flows therethrough at a rate of 200 m$^3$/h, then about 10 m$^3$/h will be the designed flow rate figure. The pump will be adapted to pump 10 m3/h at the pressure of 2.5 bar.

The reactor may have the dimensions of about 6" in diameter and 1 m in length.

The separator's dimensions may include a 6" diameter 6" and a length of 1 m.

The pipes may have a diameter of about 1.5".

According to another aspect of the invention, an additional water flow path is created, wherein water flows from heat exchanger through a UET reactor, wherein solids in the water are deposited using a partial electrolysis process. The system may also include a solids separator. Thus, solids will deposit in the UET reactor rather than in the tubes of the heat exchanger.

The additional path is created in parallel with the prior art water flow path, from the heat exchanger to the cooling tower and back.

It is much easier to remove such deposits from the UET reactor, than from the tubes of the heat exchanger.

While cleaning a UET reactor, another clean reactor may be inserted into the system, so the heat exchanger system will continue to operate undisturbed;

otherwise, the system may continue to operate for a certain period even without a UET reactor.

BEST MODES FOR CARRYING OUT THE INVENTION

The current invention will now be described by way of example and with reference to the accompanying drawings.

Figure 3:
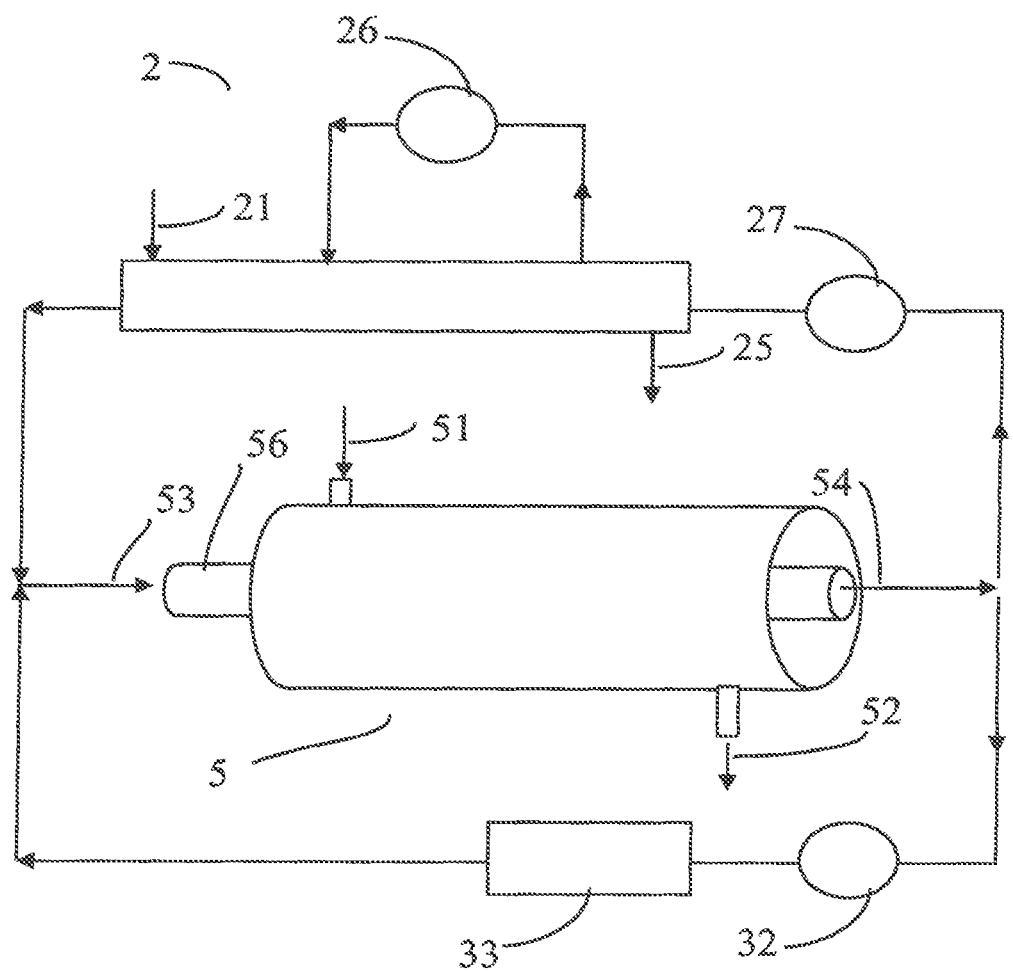
FIG. 3 illustrates a new heat exchanger system.

Referring to FIG. 3, which illustrates a new heat exchanger system, in heat exchanger 5 there is a hot fluid in 51, the fluid to be cooled down in the heat exchanger, and a cooled fluid out 52.

The fluid is cooled using cold water 53, which results in the hot water 54. Water flows through a water tube 56.

In a cooling tower 2, there is illustrated a circulation pump 27, the ambient air in 21, including dust, and evaporation, vapors out 25.

Furthermore, the tower 2 may include a path for water recirculation therein, using a circulation pump 26.

The path between the heat exchanger 5 and cooling tower 2 is the usual, prior art water flow path.

The new, additional water flow path is from the heat exchanger 5 through the circulation pump 32 and the UET reactor 33, and back to the heat exchanger 5.

Figure 4:
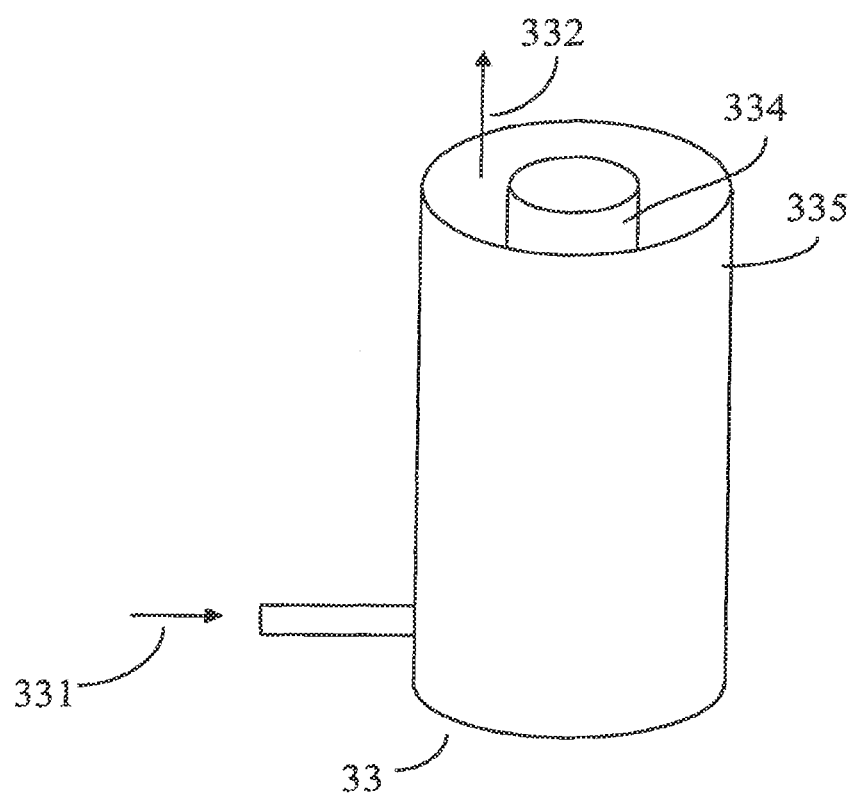
FIG. 4 details the UET Reactor™.

FIG. 4 details the UET Reactor™ 33, with water in 331, water out 332;

Partial electrolysis is performed in the reactor 33, wherein the cathode 335 comprises the outer envelope of the reactor 33, and the anode 334 is located inside the reactor. Sediments will deposit on the cathode.

Figure 5:
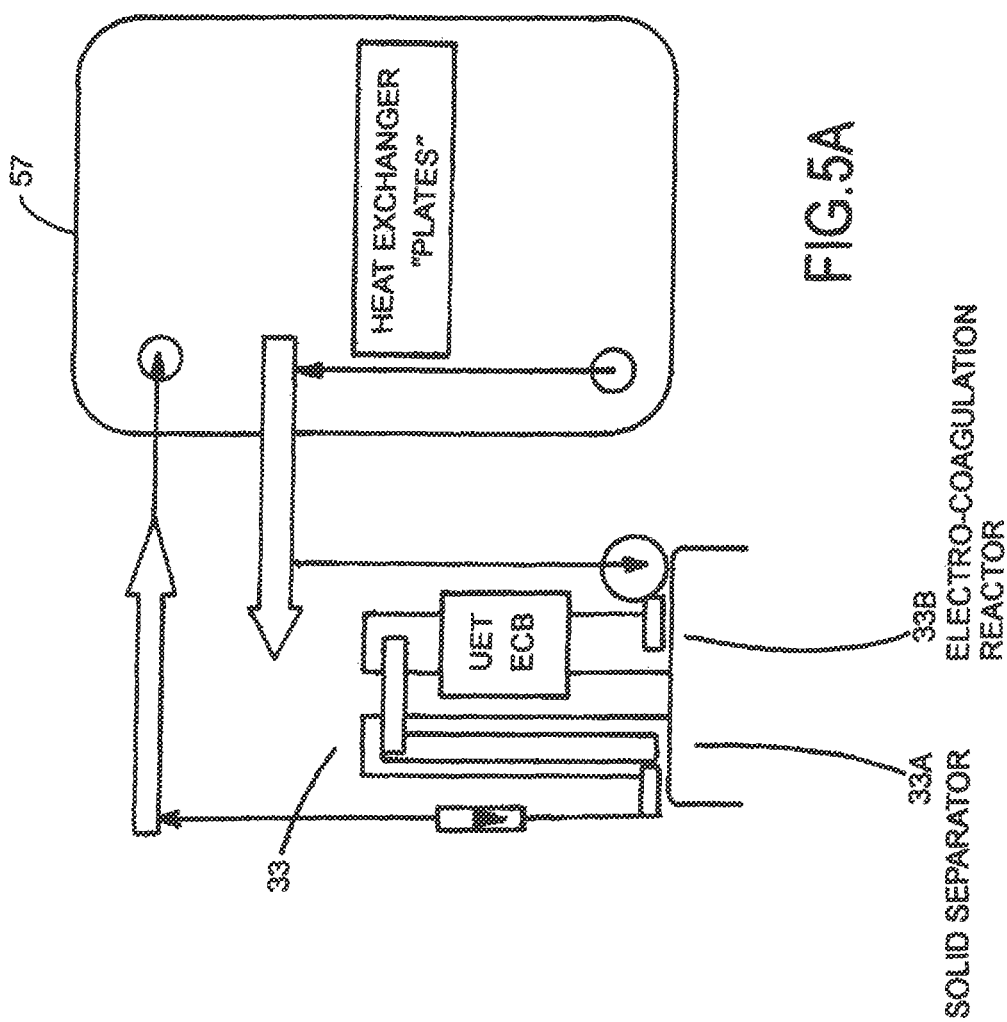
FIGS. 5A-5B illustrate a heat exchanger with solids removal.

FIG. 5A illustrates a heat exchanger with solids removal and a front view of the heat exchanger plates, including the heat exchanger plates 57, the UET reactor 33, a solids separator 33A and an electro-coagulation reactor 33B.

FIG. 5B details a side view of the heat exchanger plates, including the heat exchanger plates 57 and the water tubes 56.

Figure 6:
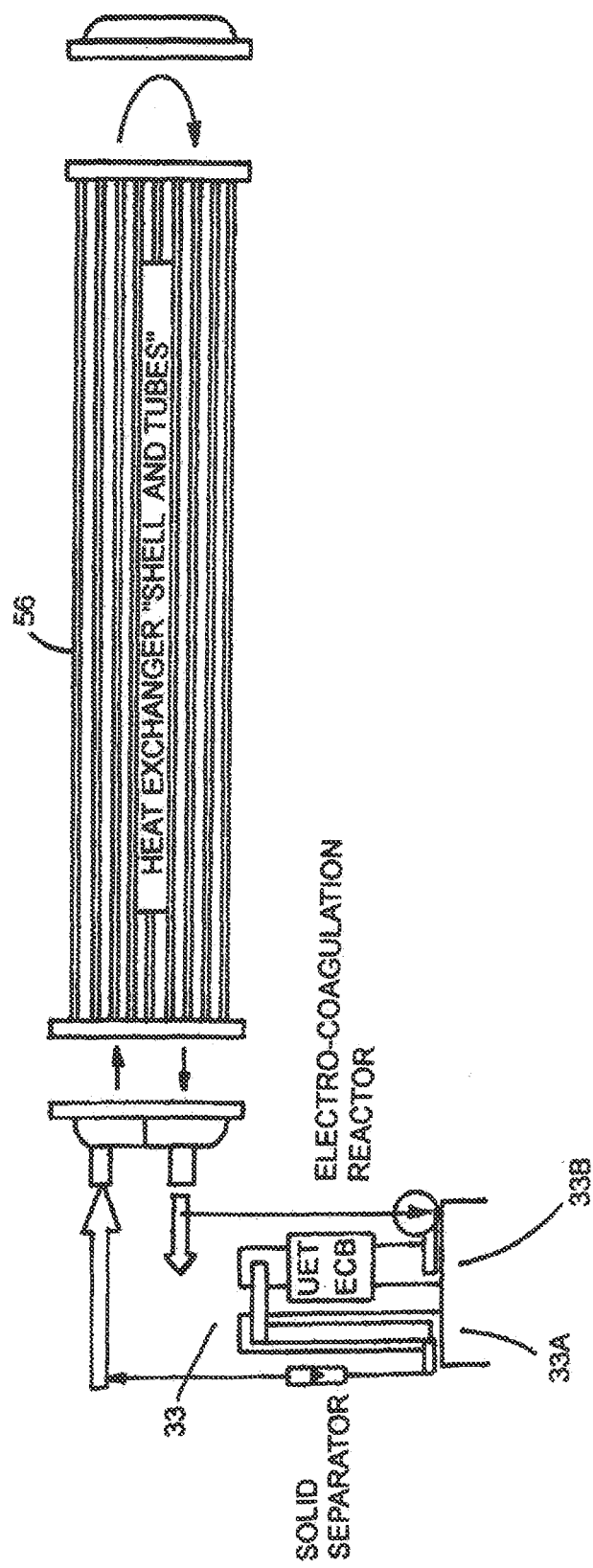
FIG. 6 illustrates another heat exchanger with solids removal.

FIG. 6 illustrates another heat exchanger with solids removal, including the water tubes 56 of the heat exchanger, with the UET reactor 33, solids separator 33A and an electro-coagulation reactor 33B.

Figure 7:
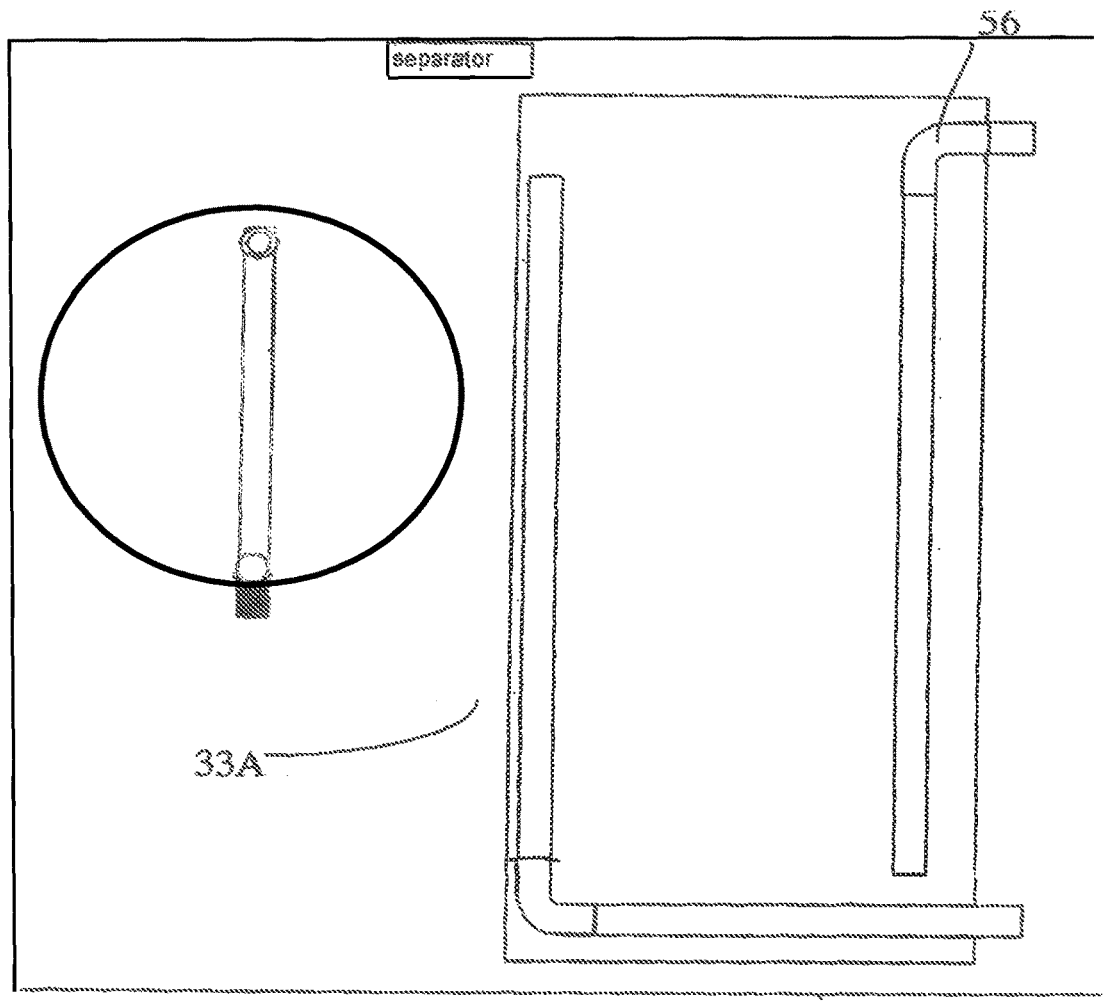
FIG. 7 illustrates the structure of a separator.

FIG. 7 illustrates the structure of a separator, including water tubes 56 of the heat exchanger, with the solids separator 33A.

Figure 1:
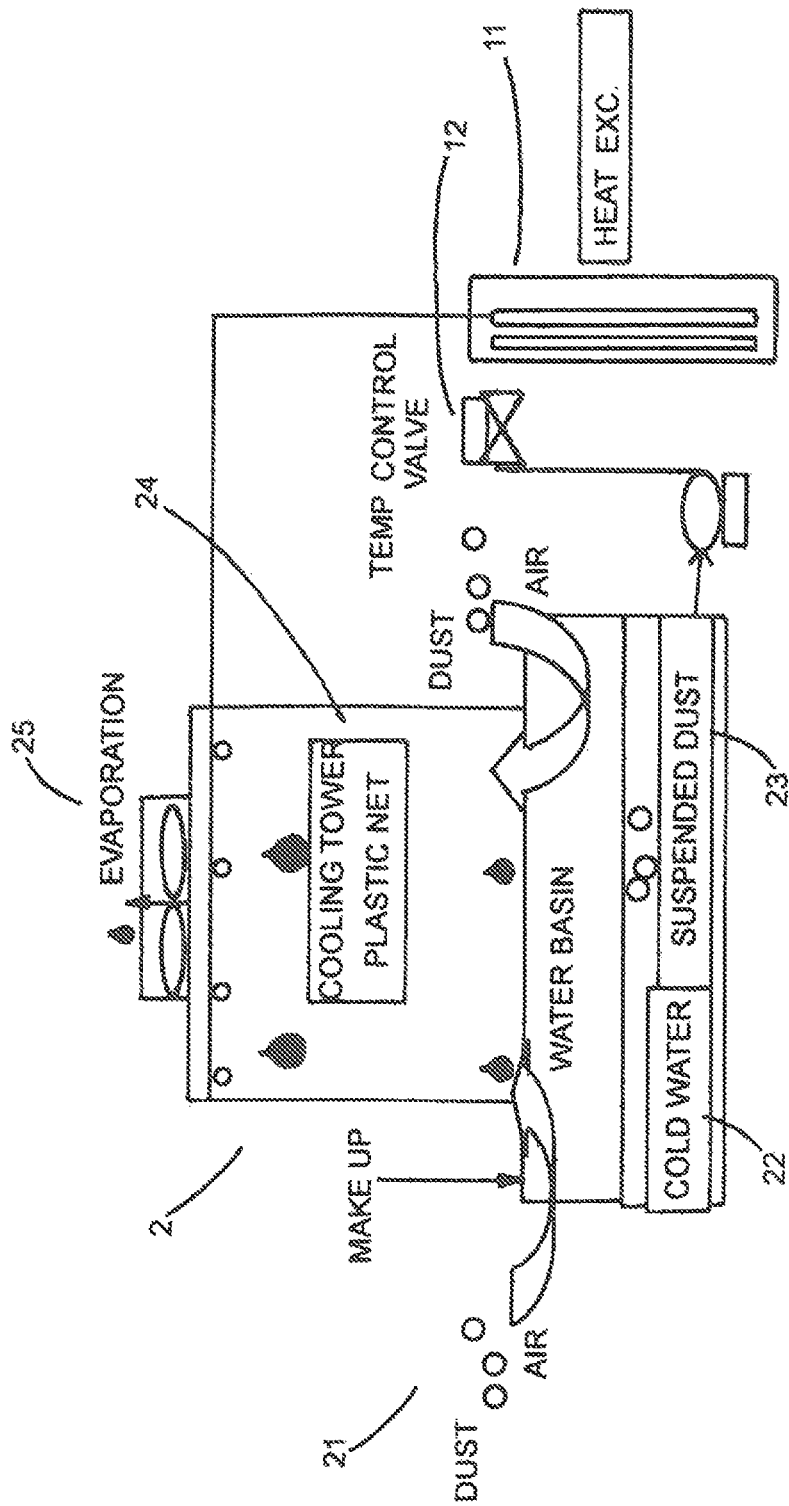
FIG. 1 details a prior art heat exchanger system.
Figure 2:
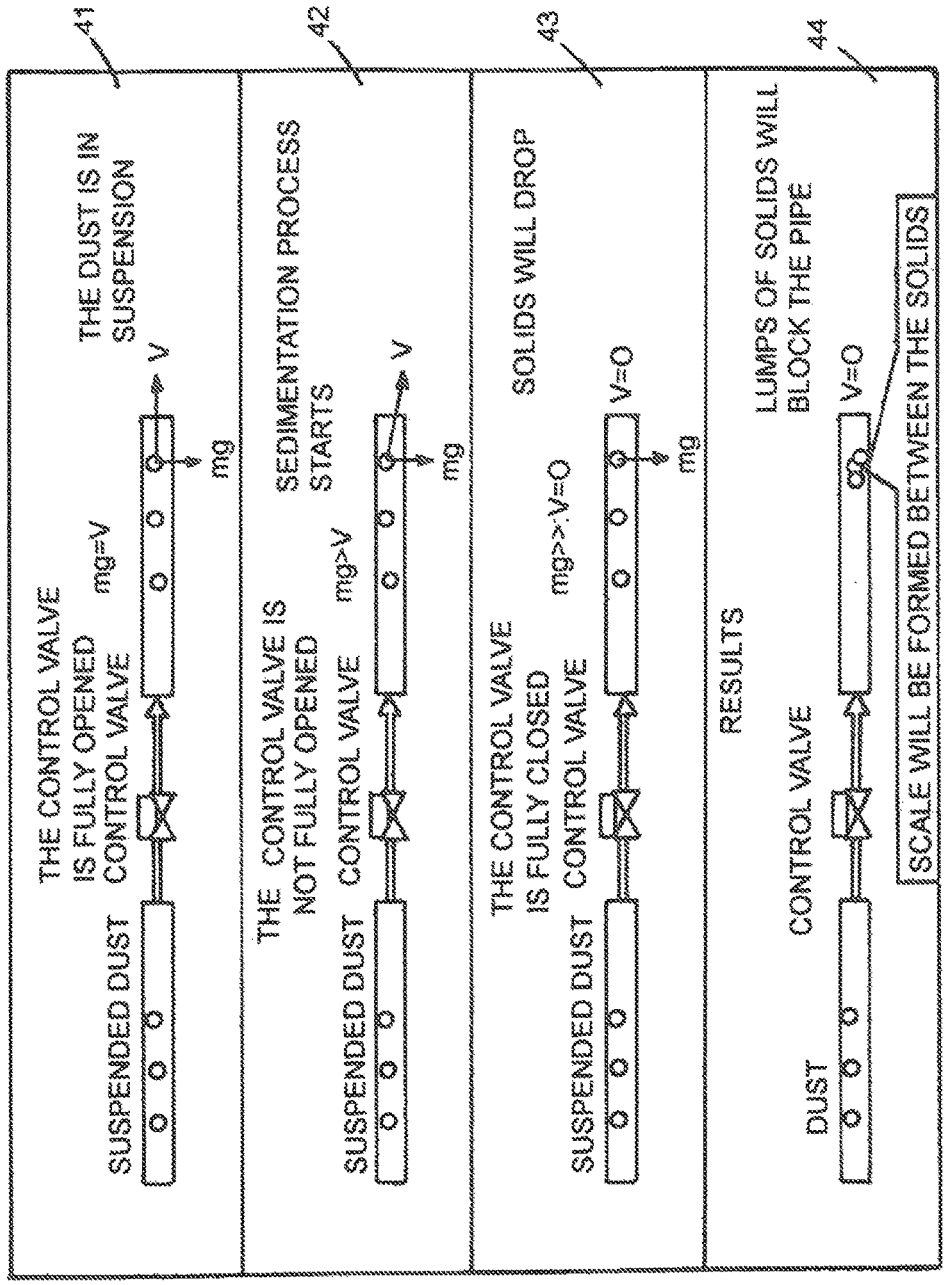
FIG. 2 illustrates the problem during the operation of prior art heat exchanger systems.

In FIG. 2, the term "mg" refers to mass multiplied by the acceleration constant of gravity. In FIG. 5A and FIG. 6, the term "ECB" refers to an "electrolysis circuit board."

It will be recognized that the foregoing is but one example of an apparatus and method within the scope of the present invention and that various modifications will occur to those skilled in the art upon reading the disclosure set forth hereinbefore.

INDUSTRIAL APPLICABILITY

The invention relates to methods for removing solids and minerals from heat exchangers in water-cooled systems. Furthermore, the method can be used for preventing or reducing sedimentation of solids and minerals in various water conduits and water transfer equipment.

The method may be implemented in industry by forming an additional path in parallel with the first path, wherein water flows from the heat exchanger to a UET reactor and back to the heat exchanger, and wherein the UET reactor including means for solids removal from the water using a partial electrolysis process.

What is claimed is:

1. A method for removal of suspended solids in a water facility, comprising:
   providing a first water flow path that includes water flow to and from water equipment, the water equipment being at least one of (i) equipment that acts as a water conduit and (ii) water processing equipment; and
   providing an additional flow path in the water facility in parallel with the first water flow path, wherein in the additional water flow path water flows from the water equipment to a partial electrolysis reactor and back to the water equipment, and wherein the partial electrolysis reactor is configured to remove suspended solids from the water using a partial electrolysis process that includes electro-coagulation of the suspended solids, the partial electrolysis process comprising applying a voltage that decomposes the water into hydrogen ions and hydroxyl ions,
   wherein the volumetric flow rate in the additional path is about 5% of the volumetric flow rate in the first water flow path.

2. The method for removal of suspended solids according to claim 1, wherein the partial electrolysis reactor comprises an outer envelope functioning as a cathode for the partial electrolysis, and a second electrode inside the outer envelope functioning as an anode for the partial electrolysis.

3. The method for removal of suspended solids according to claim 1, further comprising operating the partial electrolysis reactor at a water velocity of about 0.2 m/s.

4. The method for removal of suspended solids according to claim 1, further comprising providing as part of the additional path a flow path for the water inside the partial electrolysis reactor such that the flow path for the water inside the partial electrolysis reactor has a length of about 1 meter.

5. A method for removal of suspended solids in a water facility, comprising:
   providing a first water flow path from a water conduit or water transfer equipment, to water processing equipment and back to the water conduit or water transfer equipment; and
   providing an additional flow path in the water facility in parallel with the first water flow path, wherein in the additional water flow path water flows from the water conduit or water transfer equipment to a partial electrolysis reactor and back to the water conduit or water transfer equipment, and wherein the partial electrolysis reactor is configured to remove suspended solids from the water using a partial electrolysis process that includes electro-coagulation of the suspended solids, the partial electrolysis process comprising applying a voltage that decomposes the water into hydrogen ions and hydroxyl ions, wherein the volumetric flow rate in the additional path is about 5% of the volumetric flow rate in the first water flow path.

6. The method for removal of suspended solids according to claim 5, wherein the partial electrolysis reactor comprises an outer envelope functioning as a cathode for the partial electrolysis, and a second electrode inside the outer envelope functioning as an anode for the partial electrolysis.

7. The method for removal of suspended solids according to claim 5, further comprising operating the partial electrolysis reactor at a water velocity of about 0.2 m/s.

8. The method for removal of suspended solids according to claim 5, further comprising providing as part of the additional path a flow path for the water inside the partial electrolysis reactor such that the flow path for the water inside the partial electrolysis reactor has a length of about 1 meter.

9. The method for removal of suspended solids according to claim 5, wherein the water processing equipment comprises a cooling tower.

10. The method for removal of suspended solids according to claim 5, wherein the water processing equipment comprises equipment in which water is heated.

11. A method for removal of suspended solids in water systems, comprising:
    providing a first water flow path that includes water equipment; and
    providing an additional flow path in the water system in parallel with the first water flow path, wherein in the additional water flow path water flows from the water equipment to a partial electrolysis reactor and back to the water equipment, and wherein the partial electrolysis reactor is configured to remove suspended solids from the water using a partial electrolysis process that includes electro-coagulation of the suspended solids, the partial electrolysis process comprising applying a voltage that decomposes the water into hydrogen ions and hydroxyl ions,
    wherein the volumetric flow rate in the additional path is a fixed fraction of the volumetric flow rate in the first water flow path, wherein the volumetric flow rate in the additional path is about 5% of the volumetric flow rate in the first water flow path.

12. The method for removal of suspended solids according to claim 11, wherein the partial electrolysis reactor comprises an outer envelope functioning as a cathode for the partial electrolysis, and a second electrode inside the outer envelope functioning as an anode for the partial electrolysis.

13. The method for removal of suspended solids according to claim 11, further comprising operating the partial electrolysis reactor at a water velocity of about 0.2 m/s.

14. The method for removal of suspended solids according to claim 11, wherein the water equipment is a heat exchanger.

* * * * *